US008363032B2

(12) United States Patent
Yang

(10) Patent No.: US 8,363,032 B2
(45) Date of Patent: Jan. 29, 2013

(54) IMAGE DISPLAY SYSTEM AND METHOD FOR DETERMINING INPUT POSITION THEREON

(75) Inventor: Kai-Chieh Yang, Niaosong Township, Kaohsiung County (TW)

(73) Assignee: Chimei Innolux Corporation, Miaoli County (TW)

( * ) Notice: Subject to any disclaimer, the term of this patent is extended or adjusted under 35 U.S.C. 154(b) by 364 days.

(21) Appl. No.: 12/768,854

(22) Filed: Apr. 28, 2010

(65) Prior Publication Data

US 2010/0315375 A1 Dec. 16, 2010

(30) Foreign Application Priority Data

Apr. 30, 2009 (TW) .............................. 98114387 A

(51) Int. Cl.
G06F 3/045 (2006.01)
(52) U.S. Cl. ...................................................... 345/174
(58) Field of Classification Search .................. 345/173, 345/174
See application file for complete search history.

(56) References Cited

U.S. PATENT DOCUMENTS

| 2008/0165138 | A1* | 7/2008 | Li ................................. 345/173 |
| 2008/0231607 | A1* | 9/2008 | Utsunomiya et al. ......... 345/173 |
| 2009/0231302 | A1 | 9/2009 | Hsueh et al. |
| 2010/0073325 | A1 | 3/2010 | Yang |

* cited by examiner

Primary Examiner — Kevin M Nguyen
(74) Attorney, Agent, or Firm — Lowe, Hauptman, Ham & Berner, LLP

(57) ABSTRACT

The present invention provides an image display system including a capacitive touch panel. The touch panel includes a plurality of groups of capacitor, and each group includes a number of capacitor modules. The touch panel also includes a processing circuit, a first scanning circuit, and a second scanning circuit. The first scanning circuit scans in turn each group. The second scanning circuit scans in turn each capacitor module of a particular group of capacitor. Then the processing circuit generates an input signal associated with a position on the touch panel.

17 Claims, 5 Drawing Sheets

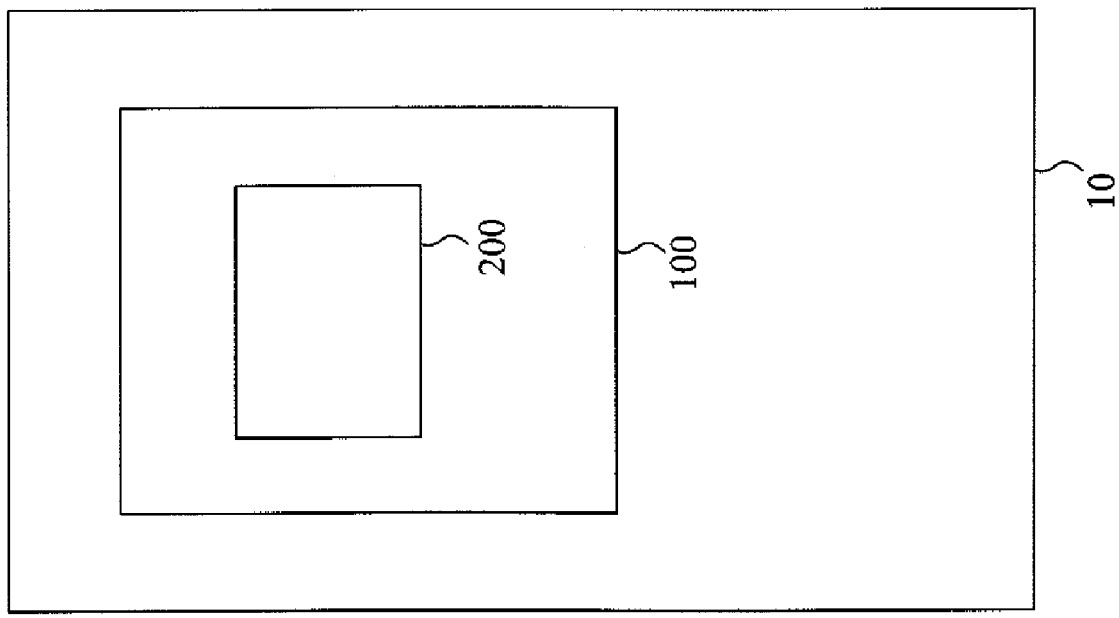

IMAGE DISPLAY SYSTEM AND METHOD FOR DETERMINING INPUT POSITION THEREON

CROSS-REFERENCE TO RELATED APPLICATIONS

This application claims the right of priority based on Taiwanese Patent Application 098114387 entitled "IMAGE DISPLAY SYSTEM AND METHOD FOR DETERMINING INPUT POSITION THEREON", filed on Apr. 30, 2009 which is incorporated herein by reference and assigned to the assignee herein.

FIELD OF INVENTION

The present invention relates to an image display system, particularly to an image display system having a touch panel which uses two-stage scanning to generate input signals associated with touching positions on the touch panel.

BACKGROUND OF THE INVENTION

Conventionally a capacitive touch panel is seldom incorporated into a monitor or a display device, particularly a flat display device such as an LCD display because the capacitive touch panel cannot provide high resolution. For example, the capacitive touch panel may be unable to respond to an object causing a too small contact area, such as a stylus tip.

Moreover, when a capacitive touch panel is disposed on a flat display device, parasitic capacitors and noises between the panel and the display device will cause some problems. Also due to the frequency limitation, line-by-line scanning may not be used here.

SUMMARY OF THE INVENTION

One aspect of the present invention is to provide an image display system, which has a capacitive touch panel incorporated into a display device. The touch panel has a two-stage scanning mechanism, where the first stage scanning is directed to large areas on the panel, and the second stage scanning focuses on smaller areas.

In one embodiment, disclosed is an image display system including a capacitive touch panel. The touch panel includes a plurality of capacitor groups, and each group includes a number of capacitor modules. The touch panel also includes a processing circuit, a first scanning circuit, and a second scanning circuit. The first scanning circuit scans in turn each group. The second scanning circuit scans in turn each capacitor module of a specific capacitor group. Then the processing circuit generates an input signal associated with a touching position on the touch panel. Alternatively, the measured capacitance of the specific capacitor module, when being touched by user, is greater than a predetermine capacitance.

In another embodiment, a method for determining the input position for a capacitive touch panel includes: (a) making the processing circuit conductive to each capacitor group in turn to measure capacitance of each group; (b) identifying a specific group from the groups according to capacitances of each group measured in the step (a); (c) making the processing circuit conductive to each capacitor module of the specific group in turn to measure capacitance of each capacitor module; (d) identifying a specific capacitor module from the capacitor modules according to capacitances of each capacitor module measured in the step (b); and (e) determining an input position according to a touching position of the specific capacitor module.

The above and others objects, features and advantages of the present invention will become more apparent from the following detailed description in conjunction with the accompanying drawings.

BRIEF DESCRIPTION OF THE DRAWINGS

The invention will now be further described by way of example only with reference to the accompany drawings in which:

FIG. 1 shows an image display system according to an embodiment of the present invention;

DETAILED DESCRIPTION OF THE PREFERRED EMBODIMENTS

The following embodiments of the present invention provide an image display system having a display device with a touch panel which uses two-stage scanning to generate input signals associated with user's touching positions on the touch panel. The invention will now be further described by way of example with reference to the accompany FIG. 1 to FIG. 2d.

As shown in FIG. 1, the image display system 1 includes an electronic device 10 with a display device 100 (such as a liquid crystal display (LCD) or organic light emitting display (OLED) display device). Particularly, a capacitive touch panel 200 is incorporated into the display device 100. The display device 100 further includes a power supply (not shown) for the operation of the touch panel 200. A user can view the images of the display device 100 through the capacitive touch panel 200.

In an embodiment, the electronic device 10 incorporating the display device 100 could be a TV, a mobile phone, a digital camera, a personal digital assistant (PDA), a notebook computer, a desktop computer, a television, a global positioning system (GPS), a car media player, an avionics display, a digital photo frame, or a portable video player.

Figure 2A:
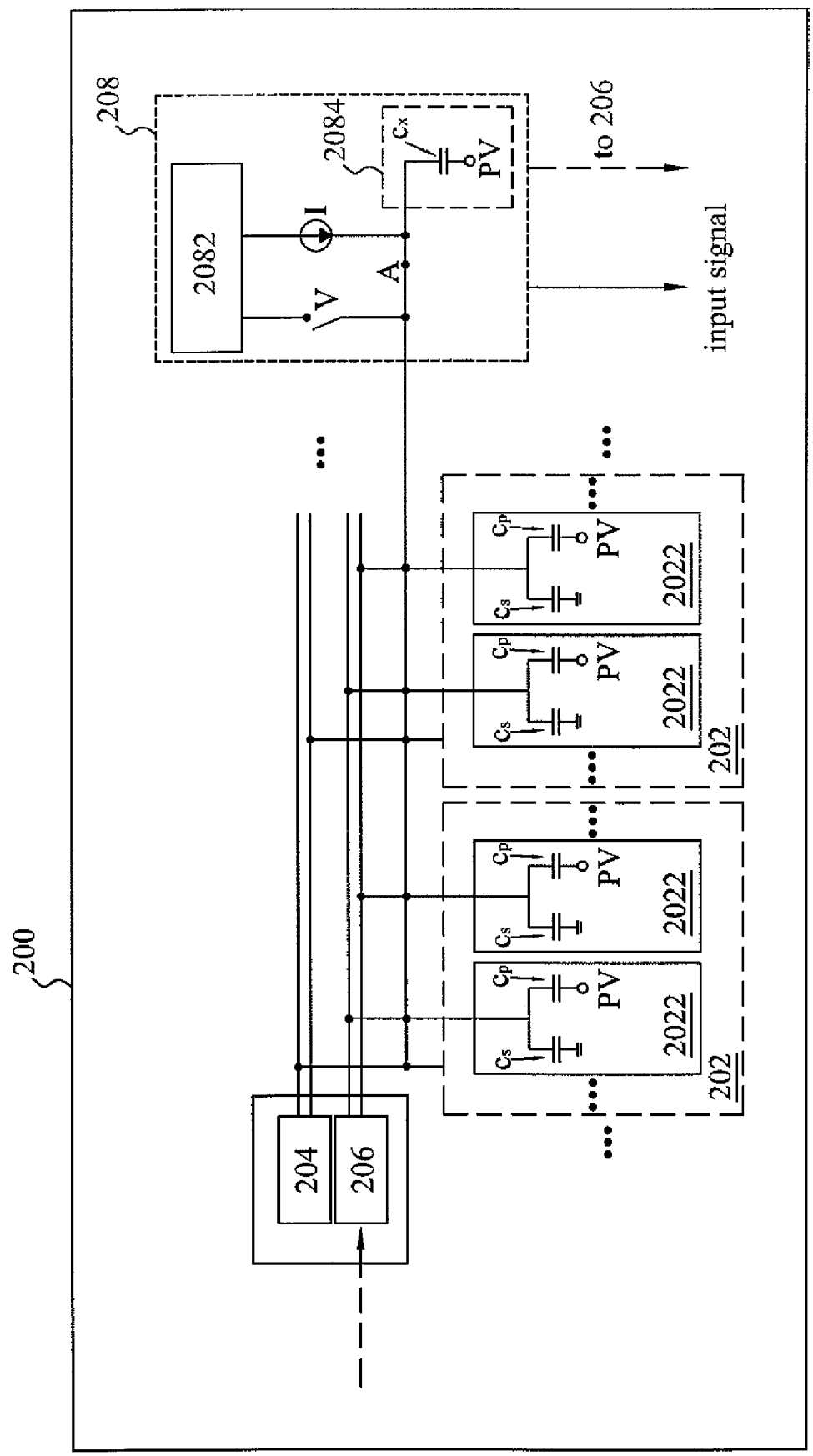
FIG. 2a shows the circuit of a capacitive touch panel according to an embodiment of the present invention.

FIG. 2a shows the circuits of the capacitive touch panel 200 according to an embodiment of the present invention. The touch panel 200 includes a plurality of capacitor groups 202, a first scanning circuit 204, a second scanning circuit 206, and a processing circuit 208. Each capacitor group 202 further includes a plurality of capacitor modules 2022, and each capacitor module may have a variable sensing capacitor Cs. An electrode of the variable sensing capacitor Cs could be embodied as a transparent electrode using Indium Tin Oxide (ITO) as material. When a capacitor module 2022 is touched by user's finger or a stylus tip, the capacitance of the capacitor module 2022 will change. This part should be well-known to those skilled in the art and thus the details are omitted hereinafter.

Figure 2B:
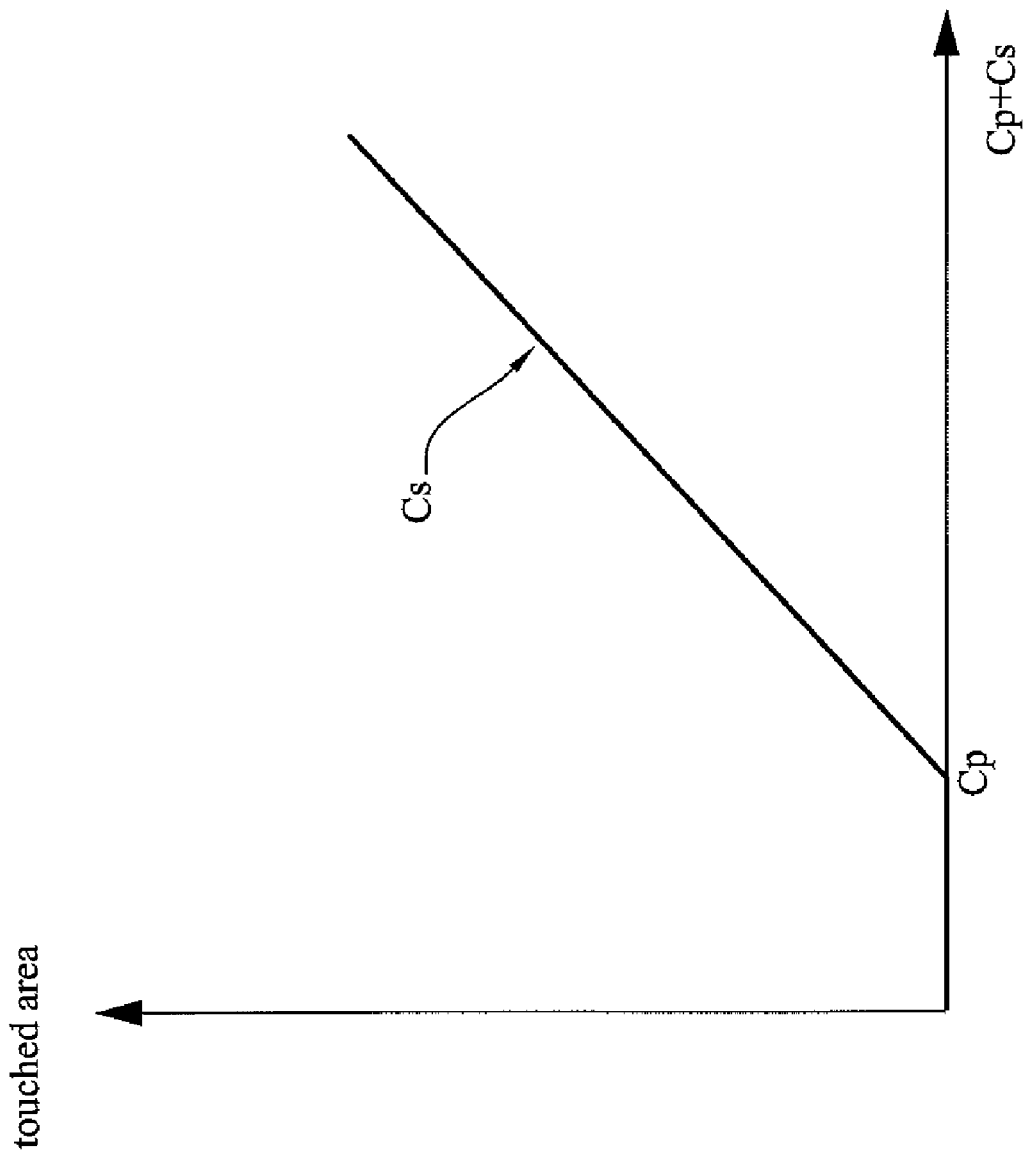
FIG. 2b illustrates the relation between capacitance and the touched area.

Note that a parasitic capacitor Cp may exist between an electrode of the capacitor module 2022 and the common electrode PV of the display device 100 or between electrodes of neighboring capacitor modules 2022. The parasitic capacitor Cp is formed when the touch panel 200 is assembled to the display device 100, and the capacitance of parasitic capacitor Cp is substantially fixed. FIG. 2b further illustrates the relation between the touched area of a capacitor modules 2022 and the resulting capacitance, wherein X-axis represents the capacitance, and Y-axis represents the touched area of the capacitor modules 2022. As shown, when the touched area increases, the capacitance of sensing capacitor Cs accordingly increases to store more electricity.

The processing circuit 208 includes a charge/discharge circuit 2082 to charge/discharge the capacitor modules 2022. Note that the parasitic capacitor Cp mentioned before will have some effects together with the sensing capacitor Cs. But as shown in FIG. 2b, when the capacitance of the sensing capacitor Cs may change in response to user's touching operation, the capacitance of parasitic capacitor Cp is around fixed.

The charge/discharge circuit 2082 provides a charging voltage V to charge the capacitor modules 2022, and provides a fixed current to the capacitor modules 2022 for discharging it. The charging/discharging periods of the circuit 2082 are fixed too. When the processing circuit 208 is conductive to a capacitor module 2022, an equivalent voltage of the capacitor modules 2022 could be measured at the node A. Accordingly, when the capacitor module 2022 is touched by the object TOB, the capacitance variance of capacitor modules 2022 will affect the equivalent voltage at the node A.

In another embodiment, the processing circuit 208 includes a noise suppressing circuit 2084, and the circuit 2084 includes a sampling capacitor Cx. When a capacitor module 2022 (or a capacitor group 202) is discharged by being conductive to the charge/discharge circuit 2082, the sampling capacitor Cx will be used to store the electricity flowed out from the capacitor modules 2022, so as to measure the capacitance or capacitance variance of the capacitor modules 2022. As mentioned above, a capacitor module 2022 unavoidably has a parasitic capacitor Cp with respect to the common electrode PV of the display device 100. When the common electrode PV brings in some noises, the electricity stored either in the capacitor modules 2022 or in the sampling capacitor Cx will be affected by the noises, so the capacitance of the capacitor modules 2022 cannot be measured accurately. Therefore in this embodiment, one node of the sampling capacitor Cx is coupled to a capacitor module 2022, and the other node is coupled to the common electrode PV of the display device 100. As shown, both nodes of the sampling capacitor Cx will be affected by the noises brought by the common electrode PV but will be offset by each other. Therefore even the common electrode PV will bring noises, the sampling capacitor Cx is still able to measure the capacitance or capacitance variance of the capacitor modules 2022 accurately.

Figure 2C:
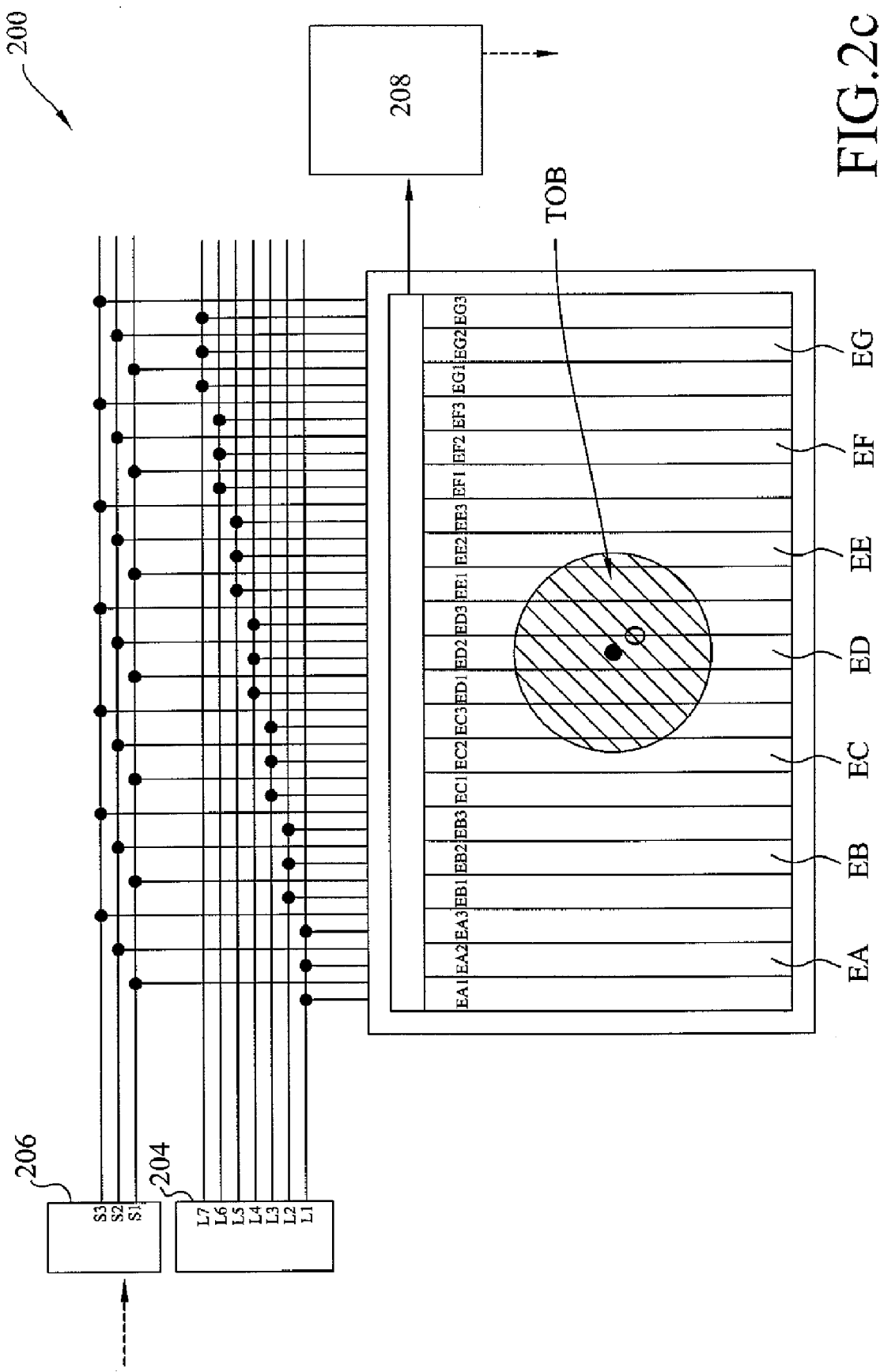
FIG. 2c shows the circuit of a capacitive touch panel according to an embodiment of the present invention.

FIG. 2c illustrates the capacitive touch panel 200 in more details according to an embodiment of the present invention. Each capacitor group (such as the capacitor group EA) includes several capacitor modules, for example, 3 capacitor modules EA1-EA3. In this embodiment, each capacitor module includes a transparent electrode with a width around 0.1 mm to 0.5 mm. The transparent electrode can have a shape of "strip" or any other shapes.

The capacitive touch panel 200 uses two-stage scanning operation. The first stage scanning is directed to the capacitor groups EA-EG, and the second stage scanning focuses on the capacitor modules in a specific group. More details will be provided later.

"The First-Stage Scanning"

As shown in FIG. 2c, the first scanning circuit 204 provides several scan lines L1-L7 respectively coupled to a capacitor group (EA-EG). The number of capacitor group matches the number of scan line. The scanning signals of the first scanning circuit 204 are sent to the capacitor groups EA to EG in turn. Receiving the scanning signals from the first scanning circuit 204, the capacitor groups EA-EG become conductive to the processing circuit 208 in turn. Here when a capacitor group is conductive to the processing circuit 208, all capacitor modules in that capacitor group are conductive to the processing circuit 208 all together. The processing circuit 208 can measure the capacitance of a capacitor group according to electricity stored by all capacitor modules in that capacitor group.

As shown in FIG. 2c, when the object TOB touches the capacitor groups EC, ED, and EE, the capacitance of their capacitor modules will be affected, for example, be greater than a predetermined capacitance, and will be detected by the processing circuit 208 using the aforementioned manner. Then the processing circuit 208 will record the capacitor groups EC, ED, and EE as "specific groups" for the second-stage scanning. In another embodiment, in addition to recording capacitance-changing groups (groups EC, ED, and EE) as "specific groups", the processing circuit also records a prior group EB and a subsequent group EF for the second stage scanning.

"The Second-Stage Scanning"

Corresponding to the number of the capacitor modules in one capacitor group, the second scanning circuit 206 further provides three scan lines S1-S3 respectively coupled to capacitor modules (EA1-EG3) of capacitor groups (EA-EG). For example, as to the group EA, the scan line 51 is coupled to the capacitor module EA1, the scan line S2 is coupled to the capacitor module EA2, and the scan line S3 is coupled to the capacitor module EA3. Following this manner, the scan lines S1-S3 are coupled to the capacitor modules EB1-EG3 of the groups EB-EG in turn.

In the second-stage scanning, the second scanning circuit 206 will not scan all capacitor modules EA1-EG3. Rather, the second scanning circuit 206 only sends scanning signals to the capacitor modules in the specific groups EC, ED, and EE (or plus the prior group EB and the subsequent group EF) recorded in the first scanning stage by the processing circuit 208. Receiving the scanning signals from the second scanning circuit 206, the capacitor modules in these capacitor groups become conductive to the processing circuit 208. The processing circuit 208 can measure the capacitances of capacitor modules EB1-EF3 according to electricity stored by them. As shown in FIG. 2c, when the object TOB touches the capacitor modules EC2, EC3, ED1, ED2, ED3, EE1 and EE2, the capacitances of these capacitor modules will change, for example, become greater than a predetermined capacitance and will be detected by the processing circuit 208. Then the processing circuit 208 will record the capacitor modules EC2, EC3, ED1, ED2, ED3, EE1 and EE2 as "specific capacitor modules" and accordingly determine a touching position on the panel 200, so as to generate an input signal related to the position.

In an embodiment, the positions of capacitor modules EC2, EC3, ED1, ED2, ED3, EE1 and EE2 are taken to calculate a "mean" position. Or capacitor modules EC2 and EE2 are determined as having the greatest distance between each other so a midpoint O of them is taken for the determination of the touching position on the panel. From the embodiments explained above, it should be note that the panel 200 allows at least two capacitor modules or two capacitor groups to be touch at the same time. Take FIG. 2c for example. The capacitor group EC has touched capacitor modules EC2 and EC3, the capacitor group ED has touched capacitor modules ED1-ED3, and the capacitor group EE has touched capacitor modules EE1 and EE2. However, those skilled in the art should understand that the embodiments are provided for exemplary purposes. The present invention does not limit the number of capacitor modules or capacitor groups which could be touched at the same time. Therefore, the embodiments having at least one touched capacitor module or having touched capacitor modules in two capacitor groups (either neighboring or not) will be in the scope of the present invention.

Notably, in another embodiment, the first scanning circuit 204 and the second scanning circuit 206 could be integrated into the signal/control circuit (not shown), to save the pins which would be disposed for the scan lines L1-L7 and S1-S3. For example, scan lines L1-L7 and S1-S3 can use the signal/control pins of the display device 100, rather than rely on additional pins for scanning.

Figure 2D:
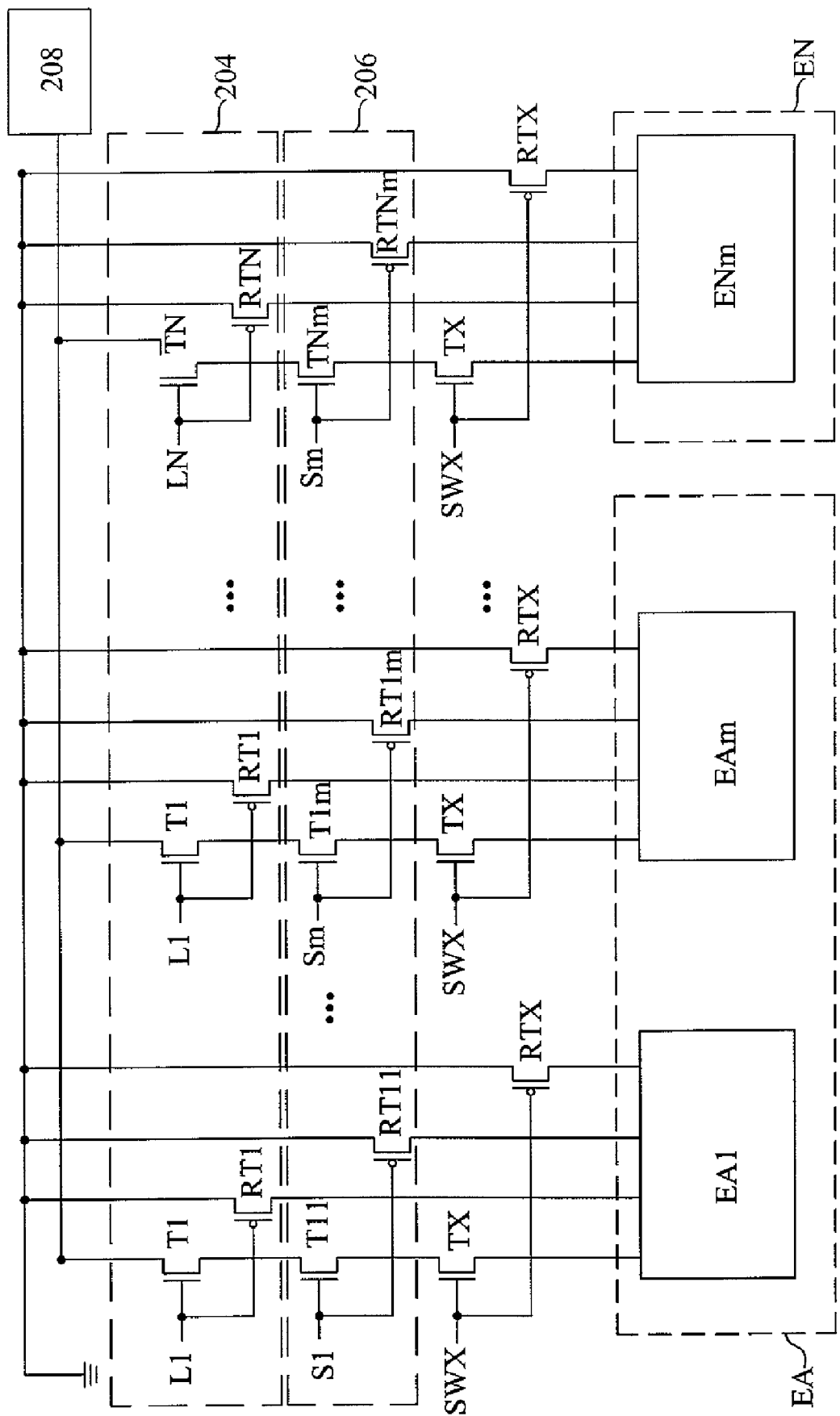
FIG. 2d shows the circuit of a capacitive touch panel according to an embodiment of the present invention.

In an embodiment shown in FIG. 2d, the capacitive touch panel 200 has a switching unit including several switches TX. Each switch TX is controlled by one switch scan line SWX and is provided to one capacitor module. With the switches TX, scanning signals or control signals (such as other scanning signals) can "scan" the capacitor groups along X-direction (or Y-direction). The scanning in X-direction and Y-direction will result in a more accurate determination.

In the following more details are provided for the embodiments shown in FIG. 2d. The switching unit has transistor switches TX and RTX for capacitor modules EA1-ENm of the capacitor groups EA-EN. The transistor switches TX and RTX are operated inversely to each other. For example, the transistor switch TX is n-type transistor, and the transistor switch RTX is p-type transistor. The transistor switches TX and RTX are arranged associated with X-direction and are controlled by a scan line SWX in X-direction. In this embodiment, the capacitor groups EA-EN are disposed along X-direction. When receiving scanning signals from the scan line SWX in X-direction, all switches TX for capacitor groups turn ON all together, and all switches RTX turn OFF.

Take the capacitor group EA for example. The first scanning circuit 204 has several transistor switches T1 and RT1. Switches T1 and switches RT1 correspond to capacitor modules EA1-EAm in the capacitor group EA and all are controlled by a scanning line L1. The second scanning circuit 206 further includes a number of transistor switches T11-T1$m$ and RT11-RT1$m$, wherein transistor switches T11-T1$m$ are disposed respectively corresponding to capacitor modules EA1-EAm, and transistor switches RT11R-T1$m$ are disposed respectively corresponding to capacitor modules EA1-EAm too. The transistor switches T11 and RT11 are controlled by the scan line S1, and the transistor switches T1$m$ and RT1$m$ are controlled by the scan line Sm. In addition, the transistor switches T1 and RT1 are operated inversely to each other. For example, the transistor switch T1 is n-type transistor, and the transistor switch RT1 is p-type transistor. The transistor switches T1-T1 and RT11-RT1$m$ are operated inversely to each other.

For example, the transistor switches T1'-T1$m$ are n-type transistors, and the transistor switches RT11-RT1$m$ are p-type transistors. Take the capacitor module EA1 for example, where transistor switches T1, T11, and TX are serially connected. Therefore the capacitor module EA1 becomes conductive to the processing circuit 208 only when transistor switches T1, T11, and TX are ON all together. In contrast, transistor switches RT1, RT11, and RTX are connected in parallel. So the capacitor module EA1 is grounded as long as only any one of transistor switches RT1, RT11, and RTX is ON.

The operations of other capacitor groups could be referred to the capacitor group EA1 illustrated above, so the details are omitted hereinafter.

In the first-stage scanning, all switches TX and T11-TNm are ON, and all switches RTX and RT11-RTNm are OFF. The scan lines L1-Ln of the first scanning circuit 204 turn on the switches T1-TN in turn to make the processing circuit 208 conductive to the capacitor groups EA-EN in turn, so the processing circuit 208 can measure the capacitance of the capacitor groups EA-EN. In this example, the processing circuit 208 determines that the capacitance of the capacitor group EA is greater than a predetermine capacitance and thus selects the capacitor group EA for the second-stage scanning.

Then the second-stage scanning is directed to the capacitor group EA only, where all switches TX and T1 for the capacitor group EA are ON and all switches RTX and RT1 are OFF. The scan lines S1-Sm of the second scanning circuit 206 turn on the switches T11-T1$m$ in the capacitor group EA in turn to make the processing circuit 208 conductive to the capacitor modules EA1-EAm in turn, so the processing circuit 208 can measure the capacitance (or capacitance variance) of the capacitor modules EA1-EAm to select at least one of capacitor modules EA1-EAm for generating an input signal associated with the touching position on the panel.

With the arrangement mentioned above, the embodiments of the present invention provide a capacitive touch panel which could be integrated into a display device. The capacitive touch panel has some advantages over a resistance touch panel such as not increasing the thickness of the device. Meanwhile, the problems resulted from the parasitic capacitors and noises are addressed. Moreover, the two-stage scanning will increase the resolution of the capacitive touch panel.

While this invention has been described with reference to the illustrative embodiments, these descriptions should not be construed in a limiting sense. Various modifications of the illustrative embodiment, as well as other embodiments of the invention, will be apparent upon reference to these descriptions. It is therefore contemplated that the appended claims will cover any such modifications or embodiments as falling within the true scope of the invention and its legal equivalents.

I claim:

1. An image display system comprising a capacitive touch panel, said touch panel comprising:

a plurality of capacitor groups, each group comprising a plurality of capacitor modules;

a processing circuit selectively electrically connected to each groups and said capacitor modules in each group;

a first scanning circuit coupled to each group for scanning each group in turn to make said processing circuit conductive to each group in turn, whereby said processing circuit measures capacitance of each group and identifies a specific group from said groups according to measured capacitances of each group;

a second scanning circuit coupled to said processing circuit and said capacitor modules of said specific group, said second scanning circuit scanning said capacitor modules of said specific group in turn to make said processing circuit conductive to each capacitor module of said specific group in turn, whereby said processing circuit measures capacitance of each capacitor module of said specific group and identifies a specific capacitor module from said capacitor modules according to measured capacitances of each capacitor module, so as to generate an input signal associated with a touching position on said touch panel; and a display device, said display device comprising said touch panel and a power supply, wherein said display device comprises a common electrode coupled to each capacitor module, and said processing circuit further comprises a sampling capacitor, and one node of said sampling capacitor is selectively connected to each group and each capacitor module, and the other node is coupled to said common electrode.

2. The image display system according to claim 1, wherein the measured capacitance of said specific capacitor module is greater than a predetermine capacitance.

3. The image display system according to claim 1, wherein said first scanning circuit is further coupled to said capacitor modules in each group and said first scanning circuit comprises a plurality of first scan lines;
wherein said capacitor modules in different groups are coupled to different first scan lines, and said capacitor modules in one group are couple to the same first scan line.

4. The image display system according to claim 1, wherein said second scanning circuit comprises a plurality of second scan lines, and different capacitor modules in one group are coupled to different second scan lines.

5. The image display system according to claim 4, wherein one second scan line is coupled to said capacitor modules in different groups.

6. The image display system according to claim 1, wherein each capacitor module comprises an electrode, and for each capacitor module, said first scanning circuit comprises a first switch to connect said electrode and said processing circuit;
wherein said first switches for said capacitor modules in one group become ON all together when said first scanning circuit scans said group.

7. The image display system according to claim 6, wherein for each capacitor module in said specific group, said second scanning circuit comprises a second switch to connect said electrode and said processing circuit, and said second switch is serially connected to said first switch;
wherein said second switches for said capacitor modules in said specific group become ON in turn when said second scanning circuit scans said capacitor modules in said specific group.

8. The image display system according to claim 7, wherein for each capacitor module in said specific group, said first scanning circuit further comprises a third switch and said second scanning circuit further comprises a fourth switch, said third switch and said fourth switch are connected in parallel to each other and both disposed between ground and said electrode;
wherein said third switch is operated inversely to said first switch, and said fourth switch is operated inversely to said second switch.

9. The image display system according to claim 7, wherein said groups are arranges along a predetermined direction;
wherein for each capacitor module, said touch panel further comprises a fifth switch connecting said electrode and said processing circuit, said fifth switch is serially connected to said first switch and said second switch;
wherein said fifth switch for each capacitor module is associated with said predetermined direction and become ON or OFF all together.

10. The image display system according to claim 9, wherein for each capacitor module, said touch panel further comprises a sixth switch connected in parallel to said third switch and said fourth switch;
wherein said sixth switch is disposed between ground and said electrode, and said sixth switch is operated inversely to said fifth switch.

11. The image display system according to claim 1, wherein said display device is an LCD display device.

12. The image display system according to claim 1, further comprises an electronic device, said electronic device comprising said display device, wherein said electronic device is a TV, a mobile phone, a digital camera, a personal digital assistant (PDA), a notebook computer, a desktop computer, a television, a global positioning system (GPS), a car media player, an avionics display, a digital photo frame, or a portable video player.

13. A method for determining the input position for a capacitive touch panel, said touch panel comprising a plurality of capacitor groups, each group comprising a plurality of capacitor modules, said touch panel further comprising a processing circuit selectively electrically connected to each group and said capacitor modules in each group, said method comprising:
(a) making said processing circuit conductive to each group in turn to measure capacitance of each group;
(b) identifying a specific group from said groups according to capacitances of each group measured in the step (a);
(c) making said processing circuit conductive to each capacitor module of said specific group in turn to measure capacitance of each capacitor module, wherein each capacitor module is coupled to a common electrode, and said processing circuit comprises a sampling capacitor coupled to said common electrode, said method further comprising: suppressing noises by selectively coupling said sampling capacitor to each group and each capacitor module;
(d) identifying a specific capacitor module from said capacitor modules according to capacitances of each capacitor module measured in the step (c); and
(e) determining an input position according to a position of said specific capacitor module.

14. The method of claim 13, wherein said groups are arranged along a predetermined direction.

15. The method of claim 13, wherein the step (d) further comprises: identifying more than one specific capacitor modules from said capacitor modules according to measured capacitances of each capacitor module.

16. The method of claim 15, wherein the step (e) further comprises: determining two specific capacitor modules having the greatest distance between each other and determining a midpoint therebetween, and determining said input position according to said middle point.

17. The method of claim 13, wherein the step (b) further comprises: according to the scanning sequence performed in the step (a), determining a prior group scanned right before and a subsequent group scanned right after said specific group, and the step (c) further comprises: making in turn said processing circuit conductive to each capacitor module of said prior group, said specific group, and said subsequent group.

* * * * *